Feb. 20, 1968

M. D. ROBINSON 3,369,678

STOWABLE LIFT APPARATUS

Filed Oct. 21, 1965

INVENTOR
MORRIS D. ROBINSON
BY
*Lynn K. Lazzia*
ATTORNEY

United States Patent Office 3,369,678
Patented Feb. 20, 1968

3,369,678
STOWABLE LIFT APPARATUS
Morris D. Robinson, 3721 W. 185th St.,
Torrance, Calif. 90504
Filed Oct. 21, 1965, Ser. No. 499,627
17 Claims. (Cl. 214—77)

ABSTRACT OF THE DISCLOSURE

A load-lift apparatus for the rear end or side of a truck or equivalent vehicle, wherein a lift platform or deck is carried by parallel arm linkage in a leveled position during elevation from ground level to truck bed level by a hydraulic cylinder exerting an upward pull against the lift arms at a point located outwardly of a transverse horizontal fulcrum axis on which they are pivotally attached to the vehicle for vertical swinging movement. The parallel arms of the linkage are sectional, articulated and foreshortenable in a manner such as to provide for manually operated folding of the deck over and into the linkage for stowing it in a non-use position, and, further, to draw the deck and linkage inwardly toward the fulcrum axis with a foreshortening effect so as to substantially eliminate any protrusion of the apparatus beyond the marginal limit of the vehicle body when in the stowed position.

This invention relates to lift apparatus for carrier vehicles such as freight trucks, vans and the like. The invention relates particularly to the type of lift apparatus wherein a lift deck is carried by parallel-arm linkage for elevation from a loading position adjacent the ground to a transfer position leveled with the bed of the vehicle, and vice versa (for unloading); the linkage maintaining the deck substantially leveled in all positions of elevation and descent; and wherein the linkage includes means whereby the deck can be folded into the linkage and thence elevated to a stowed position beneath the bed of the vehicle. The general object is to provide a lift apparatus of this general type incorporating improvements whereby the folded deck-linkage combination is foreshortened into a more compact assembly, within the legal limits on length, with substantially no protrusion beyond the vehicle floor area, and which does not interfere with doors of the vehicle. Further objects are to improve upon the load-carrying strength and durability of the apparatus and to facilitate the manual folding of the deck into the linkage preparatory to moving it to the stowed position.

An important object of the invention is to provide a load lift apparatus of the type indicated, which is especially adapted for installation in a freight truck or van having a side-loading door. Because of the restrictions of vehicle laws against excessive width of truck bodies and against lateral protrusions from such bodies, it is not permissible to provide any lateral extension of the door sill or bed of a side-loading truck body, such as is commonly utilized in the installation of rear-end fold-under loading lifts (tail gate lifts and the like) in freight trucks. A special object of the present invention is to provide a load-lift apparatus which can be satisfactorily installed and utilized in a side-loading truck or the like, without involving any protrusion beyond the vertical plane of the adjacent margin of the truck, or any cutting into the floor space of the vehicle. In general, this is attained by the provision of means to store the lift within the margin of the truck floor, i.e., below the floor and not projecting beyond its margin.

Toward the attainment of the foregoing general objects, the invention provides a load-lift apparatus:

(1) Having parallel arm lift linkage embodying compression-operating lift arms and parallel tension arms both of which are provided with means for foreshortening them in the folding of the deck for stowing, whereby to provide increased foreshortening of the folded linkage-deck assembly;

(2) Wherein the foreshortening of the lift arms is provided for by an elbow-bending type of sectional arm construction including means for locking the lift arms for operating in compression in one position of bending movement thereof, and wherein foreshortening of the tension arms is provided for by a telescoping construction involving limited longitudinal sliding of one arm section within another and with means for transmitting tension load from one section to the other in their positions of maximum extension;

(3) Including spring-loading means acting in tension between the elbow-bending sections of the lift arms, operative on one side of dead-center to assist in folding the outer arm sections inwardly toward the inner arm sections for foreshortening of the lift arms and shifting the deck bodily inwardly during the deck-folding operation;

(4) Including improved means which become operable after an initial stage of swinging movement of the deck toward folded position, to transmit such swinging movement from the heel of the deck to the outer lift arm sections so as to positively transmit to these arm sections the swinging movement described in the previous paragraph;

(5) Including means for arresting descent of the lift arm linkage at a point where the pivotal connections between the same and the heel of the deck will clear the ground so as to facilitate the unfolding and folding of the deck adjacent the ground level and so as to prevent the possibility of unlocking the lift arms as the result of fulcruming of the linkage-to-deck connections against the ground while applying lift through the linkage after loading the deck, which could result in failure of the leveling support of the deck and consequent tilting of the deck and dumping of its load;

(6) Having improved outboard bracket means for connecting the parallel arm linkage to the deck heel with the lift arms disposed inwardly of the tension arms; and wherein the load-carrying capacity of the linkage-to-deck connecting pivots is greatly increased and the possibility of failure thereof is substantially eliminated.

Other objects and advantages will become apparent in the ensuing specification and appended drawing in which:

Referring now to the drawings in detail, I have shown therein, as an example of one form in which the invention may be embodied, a lift apparatus especially suitable for installation as a side lift in a truck indicated in phantom at A, said lift comprising, in general, a mount frame B adapted for installation beneath the bed of the truck A; a parallel arm linkage C carried by the mount frame B; a sectional deck D carried by the outer ends of the arms comprising the parallel arm linkage C; an hydraulic actuator E operating between the mount frame B and the parallel arm linkage C for elevating the linkage C and the deck D; a prop F for supporting the deck D in an off-the-ground lowered position for loading, and from which the folding operation of FIG. 2 can be accomplished; outboard bracket units G connecting the linkage C to the deck D; spring-loading means H operating between the mount frame B and the outboard brackets G for assisting the foreshortening of linkage C; and a safety hook I (FIG. 11) for preventing sagging of the stowed deck-linkage assembly from its stowed position.

The essential parts of truck A to which the invention is particularly related are the bed 11, which provides an elevated floor 12 onto which loads are to be moved from the lift deck D when elevated so as to be leveled with the floor. A side margin of bed 11 is indicated at 13, at the lower extremity of a doorway 14 or other open space through which the load can be moved. In the structure shown in FIG. 1, the door 14 is located in the side of a closed-body truck, and the invention deals with the specific problem of folding the lift apparatus into a sufficiently compact condition to bring substantially all portions thereof beneath the floor area, flush with margin 13, as well as the problem of bringing the heel of deck D snugly close to the deck margin 13 in the elevated, load-transfer position of the deck shown in dotted line in FIG. 1. To accomplish both of these objectives conjunctively has in the past presented a very difficult problem.

The conventional truck body normally has its bed 11 supported on floor joists 15, to which the mount frame B is attached.

Mount frame B comprises a torque tube 16 having end plates 17 secured to its ends and projecting therefrom laterally toward the lift linkage; one or more pairs of mount plates 18 secured to its upper side, projecting upwardly and providing for attachment of the mount frame to floor joists 15; pairs of spaced mount ears 20 for pivotal support of the corresponding ends of the other set of arms of linkage C; clevises 19 secured to end plates 17 and mount ears 20 for pivotal support of the inner ends of one set of arms of linkage C; and an actuator bracket 10 secured to and arising from the center of the torque tube.

Linkage C comprises a set of lift arms each comprising inner and outer sections 21 and 22 hinged together at 23 for elbow-action foreshortening and acting in compression for lift operation; and a set of parallel arms of telescoping construction for foreshortening and acting in tension for lift operation, each comprising a scabbard 24 of flat rectangular tubular cross-section and a blade 25 of flat bar stock having a longitudinal slot 26 pierced by a pin 27 bridging between and anchored in the sides of scabbard 24. Each scabbard 24 has a tail 28 extending therefrom at an upward obtuse angle. The slot 26 is of such a length and so positioned that engagement of the pin 27 against its outer end will provide a connection between the arm sections 24 and 25 such as to provide its tension load-carrying function. This is the position of full extension of the tension arm. In the various foreshortened positions of the tension arms, they function as guide arms without any load-carrying function. The linkage arms are arranged in adjacent paired relation, one pair at each side of the linkage, each pair comprising a lift arm 21, 22 and a parallel arm 24, 25 located laterally outwardly of the lift arm 21, 22.

The lift arm sections 21 have their ends mounted on pivots 30 each supported in a respective pair of mount ears 20. The parallel arm blades 25 have their exterior ends mounted on pivots 31 spaced substantially vertically above the respective pivots 30 and carried by the clevises 19. Thus the linkage arms are mounted to frame B for upward swinging in parallel relationship so as to maintain their outer end pivots parallel to pivots 30, 31. The linkage arms have outer, swinging ends provided with respective pivots correspondingly spaced vertically during lift operation, said outer end pivots consisting of lower pivots 32 connecting the ends of lift arm sections 22 to the heel of deck D at the lower side thereof when leveled, and upper pivots 33 connecting the ends of scabbard tails 28 to the heel near the upper level of the deck.

Figure 1:
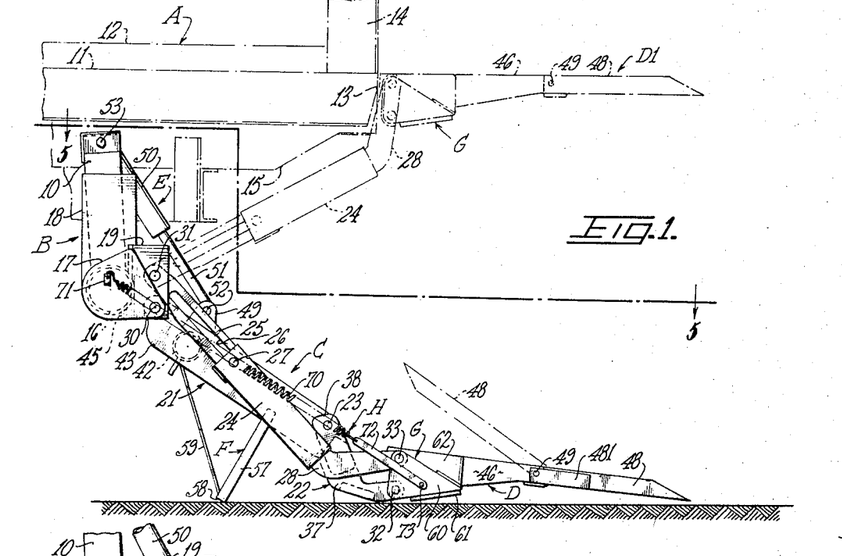
FIG. 1 is a side elevational view of a lift embodying my invention as installed for operation at the side of a truck, a cross section of which is shown in phantom; the lift being shown in full lines in a lowered, loading position from which a stowing operation may be started; a preliminary fold in the stowing operation being shown in phantom; and an elevated position, from which its load can be transferred into the truck through a side door thereof, also being shown in phantom.

At this point it may be noted that the lift operation of this apparatus, in elevating a load from a loading position of the deck D shown in full lines in FIG. 1, upwardly to the unloading position shown in dotted lines at D1 in FIG. 1 (lift being applied to the linkage C by the actuator E) is essentially the same as that of well known lift apparatus now in extensive use, and in this respect, the invention provides a combination of means for applying lifting power and for simultaneously maintaining the deck D in a leveled position, equivalent to and fully as satisfactory and durable as that of the known lift mechanisms. However, the attempt to apply the conventional lift mechanisms to a side-loading and certain rear-loading applications have not met with satisfactory results, for several reasons, including (1) it has not been possible, with the known lift mechanisms, to bring the heel of the deck into close proximity to the side margin 13 of the truck bed with the upper surface of the deck leveled with the floor surface of the truck deck, a fairly wide and unsatisfactory gap being left between these parts; and (2) in attempting to place the deck in a position stowed beneath the truck bed when not in use, with the deck folded over upon or between the arms of the linkage, the extremities of the linkage and the deck heel, where connected together by the spaced pivots, have projected substantially beyond the vertical plane of the outer side of the truck body, which likewise is an undesirable condition. The present invention, in addition to providing fully equivalent means for elevating the deck with a full load while maintaining it leveled, provides means whereby the effective length of the linkage can be foreshortened during folding and stowing so as to draw the heel of the folded deck and the adjacent associated parts inwardly a sufficient distance to avoid any substantial projection of any of these parts beyond the side or rear end of the truck; and in the load-elevating operation, bringing the heel of the deck snugly into close adjacency to the side margin 13 of the truck bed while elevating the deck sufficiently to bring its upper surface to the level of the truck floor 12 without creating any interference between the linkage and the side of the truck bed 11.

As one feature of this improved arrangement, the scabbard tails 28 are arranged to project upwardly from the plane of the scabbards 24 with sufficient bend so that the adjacent portions of the linkage will be disposed adequately below the truck bed 11 and its under structure to provide adequate clearance, while the tails 28, in the fully elevated deck position D1, project almost vertically upwardly, just clearing the side margin 13 of the truck bed 11. To the same effect, the outer sections 22 of the lift arms are of angle form (FIG. 6) each including an arm 35 connected to a respective pivot 23 and a shorter arm 36 which defines approximately a right angle with arm 35, and which is connected to a respective pivot 32. This angle form of the arm sections 22 provides adequate clearance between these arms and the truck bed side margin 13, and also provides for the lift arm sections 21 and 22 to assume the upwardly bent relationship shown in FIG. 6 in which their pivots 23 are above the general plane of the linkage and in which the lift arms are locked for acting in compression so as to transmit lift to the heel of deck D.

The arm portions 35 of outer lift arm sections 22 (FIG. 9) are each composed of a part 37 disposed in the same vertical plane as the respective arm portion 36, and a pair of parallel furcations 38 joined to respective sides of part 37 in offset relation thereto and cooperatively defining a fork which is mounted on the respective ends of the pivot 23. The part 37 thus lies in the same vertical plane as the major arm section 21 (which is of flat bar form) and the end of part 37 is formed with a diagonal shoulder 39 (FIG. 6) which abuts a squared corner 40 of the major arm section 21 below the axis of pivots 23 so as to function as a stop to lock compression arm sections 22 against dropping below their downwardly-angled condition shown in FIG. 6, thereby conditioning the lift arms 21, 22 for load-lift operation. To provide adequate load-carrying bracing effect in this stop function, the pivots 23 are disposed at the upper corners of the major compression arm sections 21, and the latter are of approximately rectangular form, extending full width from their intermediate, lift receiving areas to their outer ends where coupled to the arm sections 22. From this locked condition, the lift arm sections 21, 22 can be hinged, with a downward breaking at their elbow pivots 23, so as to provide for upward and forward folding of the deck and the outboard connecting brackets G as hereinafter described.

The outer compression arm sections 22 are provided with rests 41 projecting inwardly from the respective sides of the linkage sufficiently to engage a heel margin 621 of an outboard bracket attachment plate 62 (hereinafter described) while folding the deck to stowed position to provide a fold-limiting stop.

The major lift arm sections 21 are integrally joined by a cross bar 42, preferably in the form of a cylindrical tube for maximum strength. The lift linkage further includes a pair of short arms 43 which are secured to cross bar 42 and spaced so as to embracingly engage a pair of mount ears 45 secured to torque tube 16 near its center. The arms 43 are connected to ears 45 by a hinge pin 44 which is aligned with the linkage pivots 30. The cross bar 42 is also provided, at its center, with a pair of upwardly projecting spaced clevis ears 49. The arms 43 and ears 49 are secured to the cross bar 42 by any suitable means such as welding.

Deck D (FIG. 6) is composed of an inward section having a heel attached to the deck pivots 32, 33, said inward section embodying trapezoidal side arms 46 bridged by cross bars 461, 462 and 463 to provide a frame structure which is covered by a floor sheet 47 (FIG. 7); and an outward extension section 48 hinged to the toe of section 46, 47 by hinge pivots 49. Cross bars 462 and 463 define the toe and heel respectively of deck section 46, 47. Cross bar 463 is of channel form as shown, and is welded or otherwise suitably secured at its ends to side arms 46. The deck section 48 is of suitably rigid construction which may include a floor sheet covering a rectangular box frame, and the hinged connection is provided for by a pair of hinge arms 481 secured to the respective sides of the box frame and projecting in embracing relation to the adjacent portion of deck section 46, 47. The floor sheet of deck extension section 48 (FIG. 7) has a transverse marginal lip 482 adapted to seat downwardly against a supporting shoulder provided by the transverse marginal portion of cross bar 462 projecting beyond the adjacent margin of the floor sheet 47 along the toe of the inward deck section. The axis of hinge pivots 49 is disposed sufficiently forwardly of this supporting shoulder so that adequate cantilever support will be provided for the outward deck section 48, with its floor sheet leveled with the floor sheet 47 of the inward section. From this supported position, the extension deck section 48 can be lifted and swung inwardly over the inward deck section 46, 47 as indicated in phantom in FIG. 1.

The wider ends of the frame side arms 46 at the heel of the inward deck section are coupled to the rearward ends of the arms of linkage C by the pivots 32 and 33, located at the lower and upper corners respectively of the outboard brackets G, and are mounted to the frame side arms 46 hereinafter described. The pivots 32 are fixed in the ends of sleeves 321 which in turn are fixed in the ends of the cross channel 463 bridging between and bracing the lower corners of arms 46, or may constitute the ends of a shaft extending through the deck from side to side. The floor sheet 47 of the inward deck section is provided with an integral apron 471 bent downwardly around the upper forward corners of the arms 46 and defining the heel margin of the deck.

Figures 2, 3, 4:
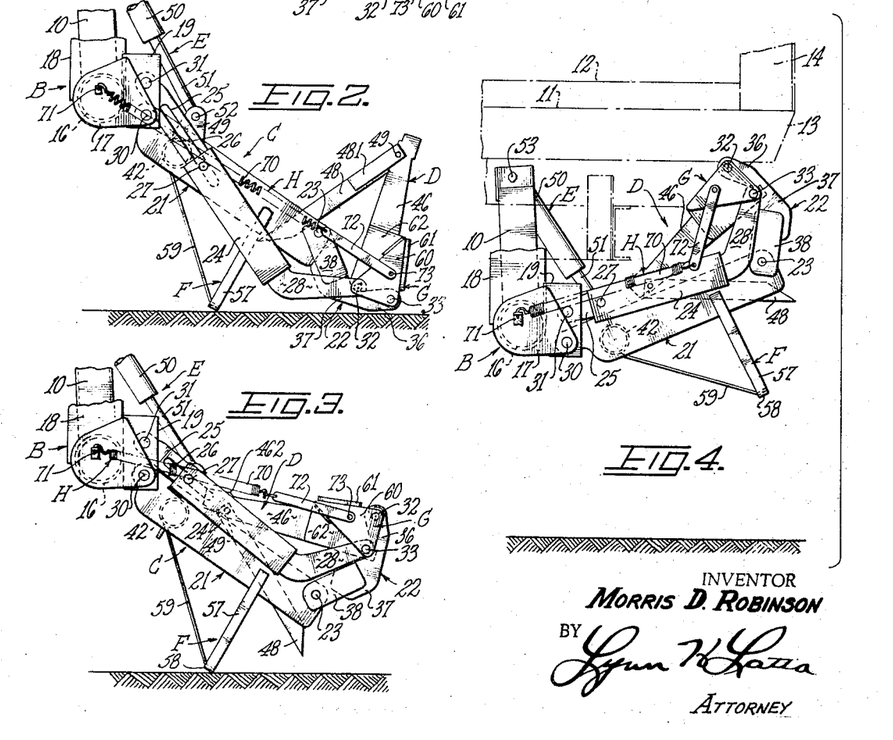
FIG. 2 is a side elevational view of the same illustrating a second fold in the stowing operation.
FIG. 3 is a side elevational view of the same, showing the apparatus completely folded and ready to be elevated to the stowed position.
FIG. 4 shows the folded apparatus in the stowed position.

Hydraulic actuator E is a conventional unit comprising a cylinder 50 having a piston (not shown) slidable therein and attached to one end of a piston rod 51 the other end of which is connected by a pivot pin 52 between the clevis ears 49 of linkage cross bar 42. At its upper end, cylinder 50 is anchored on a pivot pin 53 carried by the upper end of actuator bracket 10. Clevis ears 49 are located so as to position their forward edges for frictional engagement by the toe of the inward deck section 46, 47, whereby the deck is secured against flopping movements during transit, by having its toe cross bar 462 thus wedged against the clevis ears 49 (FIG. 3).

A suitable hydraulic connection 54 (FIG. 6) to the lower end of cylinder 50 provides for introducing hydraulic fluid under pressure below the actuator piston to draw the piston rod 51 into the cylinder. The pivotal connection 52 between the piston rod and the lift linkage is disposed outwardly from the pivots 30, 44 connecting the linkage to the torque tube 16, and thus the upward pull of the actuator is effective to swing the lift arms 21 upwardly. A manually-operable valve V, installed in a suitably convenient position at the side of the lift mechanism, connects the line 54 through a line 55 to a suitable power-operated pump P for delivering hydraulic fluid under pressure to actuator E.

Figures 6, 7, 8, 9, 10, 11, 12:
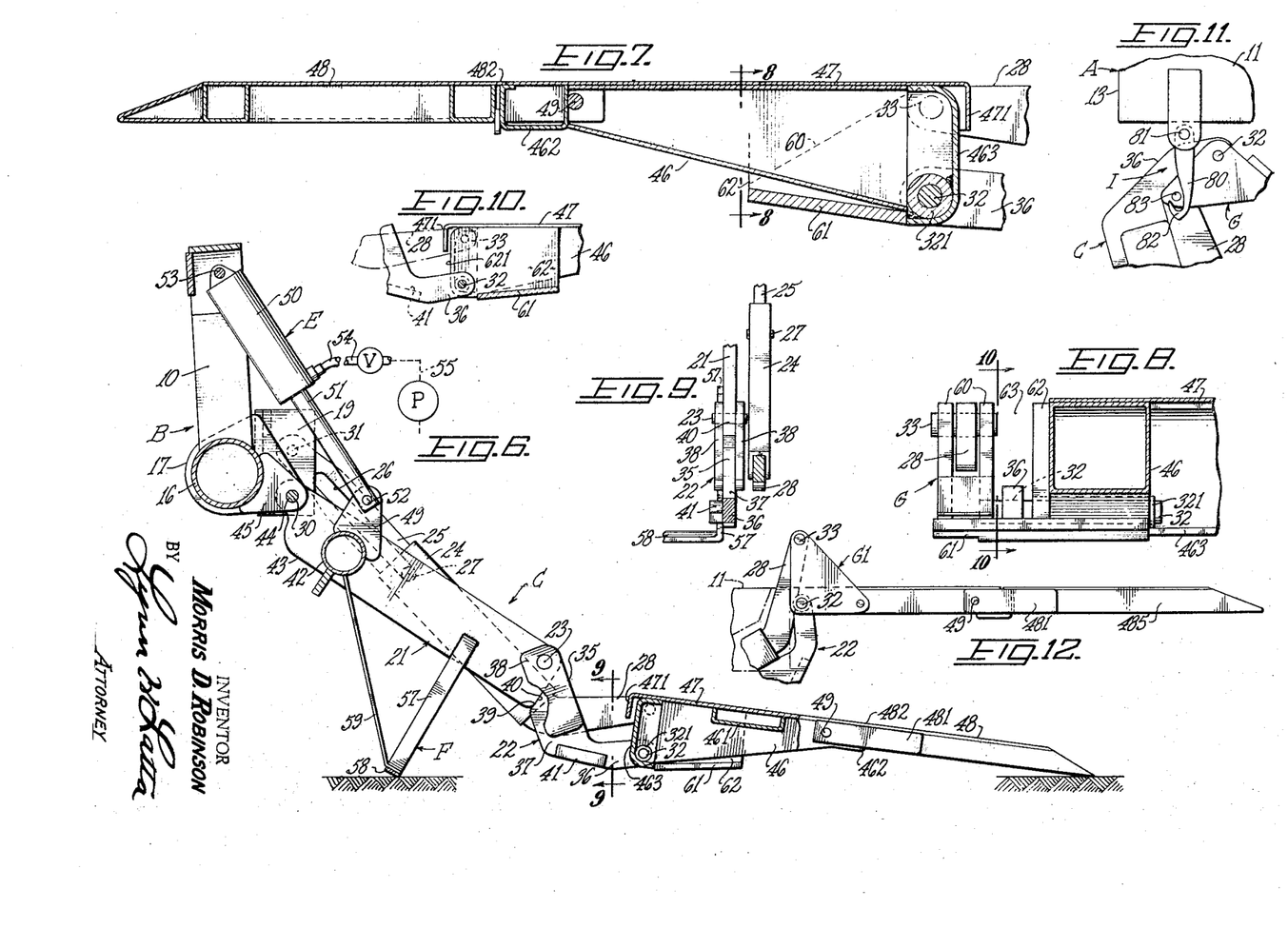
FIG. 6 is a cross-sectional view of the apparatus, with part of the deck shown in elevation, taken on the line 6—6 of FIG. 5.
FIG. 7 is a cross-sectional view of the deck looking in the opposite direction, as indicated by the line 7—7 of FIG. 5.
FIG. 8 is a detail sectional view taken on the line 8—8 of FIG. 7, showing the outboard bracket in elevation.
FIG. 9 is a fragmentary sectional view of the lift linkage taken on line 9—9 of FIG. 6.
FIG. 10 is a fragmentary detail sectional view taken on line 10—10 of FIG. 8, showing the heel portion of the deck in elevation.
FIG. 11 is a fragmentary side view of the safety hook arrangement.
FIG. 12 is a side elevation of a modified form of the deck (thin deck).

Prop F comprises a yoke having side arms 57 secured (e.g. by welding) to the lift arms 21 and a foot bar 58 extending transversely between the lower ends of arms 57 and adapted to rest against the ground; also a brace or braces 59 extending between and secured to the foot 58 and the cross bar 42. The prop F, when resting against the ground, supports the lift arms 21 in their lowered positions wherein the remainder of the linkage is supported slightly about the ground level to prevent it from contacting the ground. Accordingly, in the lowered position of the deck shown in FIG. 6, the lift arms 21, 22 will be locked, i.e. with the shoulders 39 of outer lift arm sections 22 in abutting engagement with the abutment corners 40 of lift arm sections 21 as shown in FIG. 6, and the weight of the deck D will be applied so as to maaintain this locked condition as the lift arms are swung upwardly, whereby the deck D will be cantilever-supported in leveled condition. Furthermore, when the deck D is manually lifted and folded over into the linkage C for stowing, the outer lift arms 22 will be free to swing about the pivots 23 without interference which would tend to result from contact of the arm portions 36 thereof against the ground.

The prop F prevents contact of the arm sections 22 with the ground which could result in downward breaking of the compression arm elbows at pivots 23 below "dead center" (the common plane of the axes of mounting pivots 30 and deck-connection pivots 32 of the compression arms). Such downward breaking below dead center could occur if the arm sections 21 of the compression arms were lowered sufficiently while the outer arm sections 36 were fulcrumed against the ground. If a load were placed upon the deck D under these conditions, the pivots 32 would recede under the cantilever action of deck D, the support action of the parallel-linkage would fail (the free end of the deck would drop, unsupported, and any lift applied to the major lift arm section 21 would simply result in lifting the deck heel, tilting the deck to an inclined position, and dumping its load. The prop F prevents this by preeventing the arm sections 22 from coming to rest against the ground.

Outboard brackets G provide an important improvement in connecting the lift linkage C to the deck heel, where the lift linkage arms are located outwardly of the side extremities of the deck to permit the deck to be folded into the linkage (between the lift arms). Hitherto it has been considered necessary to arrange the compression arms of the linkage outwardly of the tension arms in order to avoid interference between the deck and the linkage during folding of the deck into the linkage and the elbow-hinging or telescopic foreshortening of one pair of arms for achieving such folding by orbiting one set of the linkage-to-deck pivots (32, 33 in the present construction) about one another. In the present invention, the outboard brackets G (FIG. 8) each comprises a pair of spaced parallel vertical bracket fingers 60 in the form of triangular plates having base margins secured to the outward end portion of an outboard bracket arm 61 in the form of a rectangular plate (FIGS. 7 and 8). The inner end of bracket arm 61 is secured to the lower margin of a trapezoidal attachment plate 62 the inner face of which is secured to a respective side arm 46 of deck D adjacent its heel. The bracket 61 functions as a cantilever support for the pair of bracket fingers 60 which are separated from the attachment plate 62 by a space 63 in which the outer arm portion 36 of a respective arm section 22 is received as the deck is folded toward stowed position (FIG. 2). Arm sections 36 are pivoted in the lower extremities of spaces 63 upon the pivot pins 32 which bridge between the attachment plates 62 and the nearest outboard bracket fingers 60 and having their ends mounted in these respective plates. Being sturdily supported by sleeves 321, the pins 32 assist in supporting the fingers 60. The end of each scabbard tail 28 of the tension arms is received between the upper corners of a respective pair of outboard bracket fingers 60, and its pivot 33 consists of a pin bridging between those corners and having its ends mounted therein. The pivot pin 33 does not extend sufficiently into the space 63 to obstruct it. Thus, it is possible for the lift arm sections 22 to enter the spaces 63 without interference from the pivots 33, during the folding movement of the deck from its partially open position shown in FIG. 2 to its completely folded position shown in FIG. 3. In this folding movement, when the deck has reached the position shown in FIG. 2, the heels 621 of the attachment plates 62 (FIG. 10) will establish contact with rests 41 of lift arm sections 22, to transmit upward folding movement thereto as hereinafter described.

An important advantage of the outboard bracket construction is in providing an arrangement eliminating the necessity for relying upon cantilever support of one of the deck heel pivots from an anchorage directly to the side of the deck, with the pin projecting the full length necessary to bridge from the side of the deck to a linkage arm that is disposed outwardly of an interposed linkage arm, and with the load of said outward linkage arm being applied near the outer end of the pin. Where such a construction has been used, frequent failure of such cantilevered pins has been encountered. This problem is completely solved in the outboard bracket G in that the outboard support is provided by the plate 61 which is quite thick and of extensive area so as to have many times the cantilever strength that can be attained in a pivot pin of maximum permissible diameter; and in that the pivot pin does not depend upon cantilever support (i.e., pin 33)—it is supported at both ends. The pin 32 does provide some support, in that its outer end is secured to the inward finger 60 and functions as a tie-rod brace, and for a majority of its length it is secured in the bracing sleeve 321, but its outer end receives additional support through the adjacent bracket plate 60 from the support plate 61.

Because of the generally triangular sectional form of the deck, it is titled slightly downwardly in its loading position, to bring its toe (with ramp margin as shown) close to the ground. To avoid the necessity for such tilting, the invention provides, in FIG. 12, a modified "thin" deck wherein outboard brackets G1 project above the deck-floor level as shown, the linkage being arranged to move the pivots 32, 33 to a somewhat higher lever in the unloading position, with the pivots 33 above the truck bed floor level.

Figure 5:
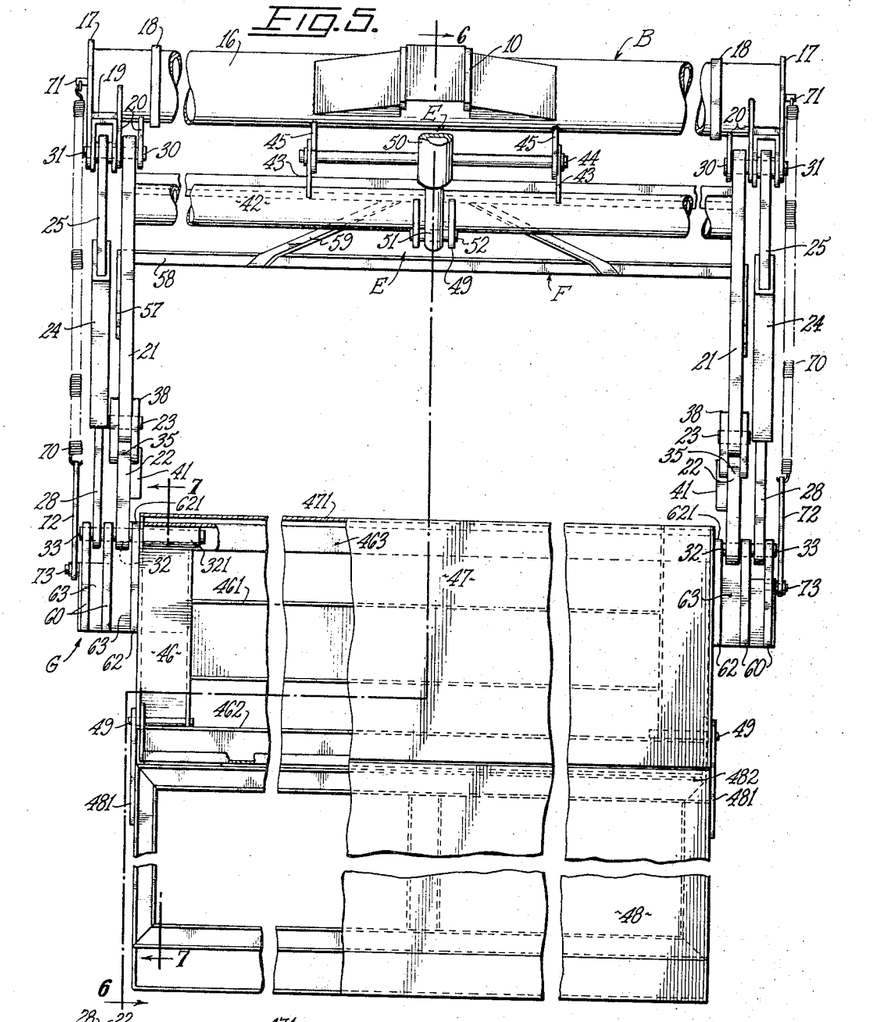
FIG. 5 is a fragmentary plan view of the apparatus, taken as indicated by the line 5—5 of FIG. 1.
Figure 5A:
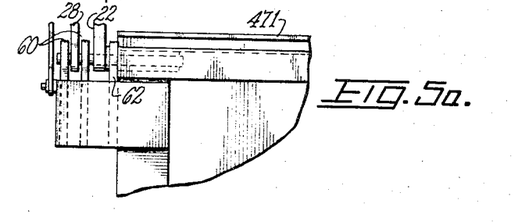
FIG. 5a is a fragmentary inverted plan view of a corner of the deck and associated linkage in the extended position of FIG. 5.

Tension loading units H are disposed just outwardly of the respective tension arms 24, 25 (FIG. 5), each loading unit comprising a coil spring 70 having one end anchored at 71 to a respective end plate 17 of mount B, and having its other end attached to one end of a respective outboard bracket G. The attachment pivots 73 are positioned so as to bring the common plane of spring loading units H below the deck heel pivots 33 and slightly below the lift arm elbow pivots 23 when the deck is in the loading position (FIG. 1). The attachment points 73 are located above the deck heel pivots 32, and as the operator commences to lift the deck toward the intermediate folded position of FIG. 2, the loading units H will immediately commence to assist this folding operation by applying a pull which starts approximately at dead center with respect to the elbow pivots 23 and quickly moves above their axis so as to apply an upward pull to the outer sections of lift arms 21, 22 at their elbow pivots 23, thereby rapidly effecting the breaking of these arms in the early stage of upward folding of the deck, and the plane of the loading units H will quickly rise above the deck heel pivots 33 so as to apply an upward pull and a counterclockwise rotational force against the outboard bracket units G, so as to assist the remainder of the folding operation up to the point of complete folding shown in FIG. 3. Thus the lifting force which the operator is required to apply to the deck is largely confined to the initial stage of unlocking the lift arms 21, 22 and moving their elbow pivots 23 approximately to dead center and below the plane of pull of the loading units H.

The tension loading units H function further to assist the operator in unfolding the deck from the stowed position (FIG. 3) to the intermediate folded position of FIG. 2, in that it will resist the unfolding so as to effectively avoid an objectional result that would tend to occur in the absence of the spring loading, namely, the swinging of the deck D by gravity from the intermediate position to the fully extended position pursuant to the impetus given to it by the operator in pulling the deck outwardly from the stowed position to the intermediate position. Since it is necessary for the operator to lean over the stowed deck in order to lift it to the intermediate position, the continued movement to the extended position would be likely to injure the shins of the operator. The loading unit H is operative to arrest the unfolding movement at the intermediate position, so that the operator can move out of the way before continuing the unfolding of the deck to the extended position, which is opposed by unit H and therefore requires the continued application of a pull to the deck for its completion.

Safety hook unit I (FIG. 11) comprises a hook 80 which is installed at one side of the truck bed 11 by means of a pivot 81 from which it hangs for free-swinging movement between a normal hanging position in which an upwardly inclined hook finger 82 on its lower end is in the path of upward movement of a pin 83 (which can be an extension of one of the deck heel pivot pins 32) as the deck approaches the stowed position of FIG. 4. At a position of maximum elevation of the folded deck-linkage assembly, the pin 83 will rise above the tip of hook finger 82 after having cammed the hook 80 outwardly, and the hook will then swing back to a hanging position in which it will catch and hold the pin 83 in the event that loss of hydraulic fluid in the actuator should permit the deck to sag from this position of maximum elevation. This function of the safety hook is utilized only in the event the deck tends to drift downwardly because of hydraulic failure, and under normal circumstances the apparatus will be supported in its fully elevated, stowed position by the actuator E, with the hook providing no support so long as the actuator E does not relax its support.

When the deck is to be lowered from the stowed position, the hook 80 is manually swung outwardly and held away from the path of pin 83 during the initial stage of lowering operation until the pin 83 has cleared the hook. In the event the deck has sagged and the pin 83 has become engaged in the hook, the actuator E is first operated to elevate the linkage sufficiently for the hook to clear the pin 83 as it is drawn back, and the assembly is then lowered.

In commencing the folding of the deck, as the attachment plate heels 621 establish contact with the rests 41 of lift arm sections 22, these arm sections will be locked to the attachment plate heels 621 so that further upward, forward tilting of the deck will force the downward breaking of the lift arms 21, 22 at their elbow pivots 23, permitting the deck to be folded into the linkage C as shown in FIG. 3, with the arm sections 22 swinging upwardly and inwardly with the heel of the deck.

As the deck is lifted upwardly and inwardly from its extended position of FIG. 1 to its intermediate position of folding movement shown in FIG. 2, the spring-loading units H will assist in such movement of the deck, and the deck-heel linkage connection pivots 32, 33 will be forced to orbit about one another, counterclockwise as viewed in these figures. Since the lift arms 21, 22 do not substantially elongate during this folding movement, the pivots 33 are forced inwardly, causing the tension arms 24, 25 to be foreshortened by the telescoping of their blades 25 into their scabbards 24. As the deck is moved from the intermediate position of FIG. 2 toward the infolded position of FIG. 3, the lift arm sections 22 will swing upwardly to the completely folded position. During the inward swinging of the deck between these two positions, the lift arm sections 22 are swung upwardly and inwardly, with the arm sections 22 and the heel pivots 32, 33 moving toward the mount bracket B until they project only a short distance beyond the rear ends of lift arm sections 21 as shown in FIG. 3. In this movement the deck is shifted bodily inwardly and the tension arms 24, 25 are further foreshortened by telescoping action. Thus the linkage-deck assembly is foreshortened so that when it is elevated to the stowed position shown in FIG. 4, the arm sections 22 will not project substantially rearwardly of the arm sections 21, and the entire assembly will be disposed below the truck bed 11 without projecting laterally beyond the sides of the truck.

In order that there may be sufficient area between the actuator clevis and folded arm sections 22 to receive the folded deck, the main lift arm sections 21 are relatively long and the outer lift arm sections 22 are relatively short, no more than half the length of arm sections 21; and the cross bar 42 is located close to the mount pivots 30. Adequate leverage in the application of lift to the arm sections 21 is attained by the height of clevis 45. The spring-loading units H remain under tension in this fully folded, foreshortened condition of the linkage deck assembly (FIG. 3) thus effectively holding it in the foreshortened condition and resisting any tendency of the assembly to open up prior to elevating to the stowed position of FIG. 4.

Elevation of the assembly to the stowed position from the position of FIG. 3 is effected by energizing the actuator E so as to apply lift to the lift arms 21. The control valve can be left in a neutral position to lock the fluid in the actuator E, whereby under normal conditions the actuator will be effective to support the apparatus in the stowed position. However, as a safety measure, the safety hook I is utilized as hereinbefore described.

When the occasion arises for utilizing the lift apparatus for loading and unloading the vehicle to which it is attached, the apparatus is first lowered to the intermediate position of FIG. 2 by actuating the control valve to release fluid from the actuator E, whereupon the apparatus will sink by gravity from the stowed position of FIG. 4 to the intermediate position of FIG. 3, coming to rest with the prop F engaged against the ground. The operator then reaches over the linkage, grasps the forward end of the folded deck and pulls it rearwardly through the position of FIG. 2 and thence downwardly to the partially extended position shown in full lines in FIG. 1 with the exception of the folded extension deck section 48 which will remain in the position shown in phantom. The extension section is then flipped from that position to its extended position shown in full lines in FIG. 1, with its free end substantially resting against the ground (its loading position). In opening the deck from its fully folded position of FIG. 3 to its intermediate position of FIG. 2, the lift arm sections 22 are swung downwardly about the elbow pivots 23 against the pull of the spring-loading units H which are thereby extended somewhat, and as the pivots 23 pass upwardly through dead center, the arm sections 22, under the weight of the cantilever-supported deck, will snap downwardly to their locked positions of FIG. 6, the lift arm sections 21 remaining supported by the prop F so that the arm sections 22 will clear the ground and execute these downward swinging movements without interference from the ground. This movement of arm sections 22 is arrested by engagement of their stop shoulders 39 against the stop corners 40 of arm sections 21 and thus the lift arms 21, 22 are again locked so as to function in compression as lift arms.

In the loading position of the deck D it is inclined downwardly and outwardly at a low incline so that its outer margin may rest against the ground, thus facilitating loading. When loaded, the deck is elevated by operating the control valve to direct pressure fluid into the actuator E, applying lift to the linkage C and from it to the deck through the pivots 32, 33 which will attain parallelism with the mount pivots 30, 31 when the platform has reached the fully elevated position shown in phantom in FIG. 1. The variation between the slight downward tilting of the deck in its loading position and the full leveling in the elevated position is provided for by spacing the mount pivots 30, 31 slightly closer together than the deck heel pivots 32, 33.

In the fully elevated position of the apparatus, the approximately 135° bends in the tension arm tails 28 and the corresponding bends in the lift arm sections 22 will enable the linkage C to "wrap around" the lower corner of the truck bed 11 at the side of the deck, with the linkage arms 21 and 24 clearing the underside of this corner, with the arm members 22 and 28 extending upwardly closely adjacent the side margin of the truck bed 11, and with the floor of the deck D leveled with the floor 12 of the truck, as shown in phantom in FIG. 1.

I claim:

1. Lift apparatus adapted to be stowed below a floor area, within the margin thereof, comprising: a load-carrying deck; arm linkage having at one end means including vertically-spaced deck pivots connecting it to said deck and at its other end having means including vertically-spaced horizontal-axis mount pivots for mounting said other end beneath an elevated floor for upward swinging of said deck to a position extending horizontally outwardly from a margin of said floor, said linkage comprising laterally-spaced pairs of arms, each pair comprising a compression arm and a tension arm, each compression arm being composed of sections pivotally connected on a horizontal axis for elbow-hinging and vertically swinging movement on the upper side of said axis only, from extended, locked, lift-transmitting relation to upwardly-bent relation in which the deck is retracted toward said mount pivots, and each tension arm comprising relatively longitudinally slidable releasable sections having means operable at maximum extension thereof to transmit loads in tension therethrough, and adapted to release to foreshortened condition accommodating said retraction of the deck, said elbow-hinging of the compression arms providing for folding the deck into the linkage for stowing beneath said floor and within its margin; and an actuator for transmitting lift to said linkage.

2. Lift apparatus as defined in claim 1, wherein said actuator is attached to said compression arms and operable to exert an upward pull thereagainst.

3. Lift apparatus as defined in claim 1, wherein said tension arms are disposed outwardly of said lift arms.

4. Lift apparatus for a vehicle, adapted to be stowed below the floor area of the vehicle, within the margin thereof, comprising: a load-carrying deck; parallel arm linkage having at one end means including vertically-spaced deck pivots connecting it to said deck and at its other end having means including vertically-spaced horizontal axis mount pivots for mounting said other end beneath an elevated floor for upward swinging of said deck to a position extending horizontally outwardly from a margin of said floor, said linkage comprising laterally-spaced pairs of arms, each pair comprising a compression arm and a tension arm, each compression arm being composed of an inner section attached to a mount pivot and an outer section attached by a horizontal axis elbow pivot to the outer end of said inner section for vertically hinging movement from an extended position in which a portion of said outer arm section abuts a stop surface on said inner arm section below said elbow pivot, whereby said compression arm is rigidified in response to application of lift force to said compression arms, so as to be operable in compression for transmitting lift to said deck, to a foreshortened position relative to said inner section in which said deck is retracted toward said mount pivots, and each tension arm comprising releasable sections having means operable at maximum extension thereof to transmit leads in tension therethrough, and adapted to release to foreshortened condition accommodating said retraction of the deck, said elbow-hinging of the compression arms providing for folding the deck into the linkage for stowing beneath said floor and within its margin; and an actuator for transmitting lift to said linkage.

5. Lift apparatus as defined in claim 4, including elongated spring means acting in tension between remote ends of said inner and outer compression arm sections and operable to hold said outer arm section in over-center relation to said elbow pivot axis in either of said bent positions.

6. Lift apparatus as defined in claim 5, including stop shoulders on adjacent ends of said compression arm sections, said shoulders being displaced downwardly from said elbow pivot axis for effecting said lift-transmitting locked condition.

7. Lift apparatus for a vehicle, adapted to be stowed below the floor area of the vehicle, within the margin thereof, comprising; a load carrying deck having a heel; parallel arm linkage having at one end means including vertically-spaced deck pivots connecting it to said deck heel and at its other end having means including vertically-spaced horizontal-axis mount pivots for mounting said other end beneath an elevated floor for upward swinging of said deck to a position extending horizontally outwardly from a margin of said floor, said linkage comprising laterally-spaced pairs of arms, each pair comprising a lift arm and a parallel arm, each lift arm being composed of an inner arm section attached to a mount and an outer arm section connected by an elbow pivot to an upper corner of the outer end of said inner section for vertically hinging movement, each pair of lift arms including stop means for limiting downward movement of said linkage arms below a plane of said elbow pivot axis, whereby said outer arm section is movable vertically above said plane from a position locked to its respective inner arm section in response to application of lift to said lift arms, so as to be operable in compression for transmitting lift to said deck, to an upwardly bent foreshortened position relative to said inner section in which said deck is retracted toward said mount pivots, and each parallel arm being of foreshortenable sectional construction, operable in an extended condition to transmit loads in tension therethrough for leveling support of the deck while lift is applied thereto by said lift arms, and yieldable to a foreshortened condition permitting said retraction of the deck, said elbow-hinging of the compression arms providing for folding the deck into the linkage for stowing beneath said floor and within its margin; and an actuator operable on said lift arms for transmitting lift to said linkage.

8. Lift apparatus as defined in claim 7, including prop means attached to said inner lift arm sections, operable by engagement with the ground to support said elbow pivots at a minimum elevation such as to allow locking of said lift arms to maintain said locked, load-transmitting condition of the lift arms by support thereof out of contact with the ground.

9. Lift apparatus as defined in claim 8, including spring means acting in tension between remote ends of said lift arms and operable to yieldingly assist in folding and unfolding said outer arm sections thereof.

10. Lift apparatus adapted to be stowed below the floor area of a vehicle, within the margin thereof, comprising: a load carrying deck having a heel; parallel arm linkage having at one end means including vertically-spaced deck pivots connecting it to said deck heel and at its other end having means including vertically-spaced horizontal-axis mount pivots for mounting said other end beneath an elevated floor for upward swinging of said deck to a position extending horizontally outwardly from a margin of said floor, said linkage comprising laterally-spaced pairs of arms, each pair comprising a lift arm and a parallel arm, each lift arm being composed of an inner arm section attached to a mount pivot and an outer arm section connected by an elbow pivot to the outer end of said inner section for hinging from a position locked thereto so as to be operable in compression for transmitting lift to said deck, to an upwardly bent foreshortened position relative to said inner section in which said deck is retracted toward said mount pivots, and each parallel arm being of foreshortenable sectional construction, operable in an extended condition to transmit loads in tension therethrough for leveling support of the deck while lift is applied thereto by said lift arms, and yieldable to a foreshortened condition permitting said retraction of the deck, said elbow-hinging of the compression arms providing for folding the deck into the linkage for stowing beneath said floor and within its margin; and an actuator operable on a pair of linkage arms for transmitting lift to said linkage, including prop means attached to said inner lift arm sections, operable by engagement with the ground to support said elbow pivots at a minimum elevation such as to allow locking of said lift arms to maintain said locked, load-transmitting condition of the lift arms by support thereof out of contact with the ground, and spring means acting in tension between remote ends of said lift arms and operable to yieldingly assist in folding and unfolding said outer arm sections thereof, said outer lift arm sections including opposed rests engageable by the heel of the deck as the latter is swung to folded position, whereby to transmit the folding movement from the deck to said outer lift arm sections so as to enforce upward swinging of said outer lift arm sections to said foreshortened positions.

11. Lift apparatus as defined in claim 7, wherein said outer lift arm sections are relatively short and said inner lift arm sections are relatively long, and wherein said actuator is coupled to said inner lift arm sections at a position close to the mount pivots, whereby the folded deck is receivable in the general area between said coupled position and the elbow pivots when folded over the deck.

12. Lift apparatus for a vehicle, adapted to be stowed below the floor area of the vehicle, within the margin thereof, comprising: a load-carrying deck; parallel arm linkage having at one end means including vertically-spaced deck pivots connecting it to said deck and at its other end having means including vertically-spaced horizontal-axis mount pivots; a mount including said mount pivots, for mounting said other end beneath an elevated floor for upward swinging of said deck to a position extending horizontally outwardly from a margin of said floor, said linkage comprising laterally-spaced pairs of arms, each pair comprising a lift arm and a parallel arm, each lift arm being composed of an inner arm section attached to a mount pivot and an outer arm section connected by a horizontal-axis elbow pivot to the outer end of said inner section for hinging movement in a vertical plane, said arm sections having interengageable stop means for limiting downward movement of the outer arm sections relative to the inner arm sections at an extended position of said deck, whereby in response to application of lift to said lift arms, each outer arm section will be locked to its inner section so as to be operable in compression for transmitting lift to said deck, each outer arm section being movable to an upwardly bent foreshortened position relative to its inner arm section in which said deck is retracted toward said mount pivots, and each parallel arm being of foreshortenable sectional construction, operable in an extended condition to transmit loads in tension therethrough for leveling support of the deck while lift is applied thereto by said lift arms, and yieldable to a foreshortened condition permitting said retraction of the deck, said elbow-hinging of the lift arms providing for folding the deck over the linkage for stowing beneath said floor and within its margin; and an actuator operable between said lift arms and said mount for transmitting lift to said linkage.

13. Lift apparatus for a vehicle, adapted to be stowed below the floor area of the vehicle, within the margin thereof, comprising: a load-carrying deck; parallel arm linkage having at one end means including vertically-spaced deck pivots connecting it to said deck and at its other end having means including vertically-spaced mount pivots; a mount including said mount pivots, for mounting said other end beneath an elevated floor for upward swinging of said deck to a position extending horizontally outwardly from a margin of said floor, said linkage comprising lift arms disposed in laterally-spaced planes outwardly of the sides of the deck and adjacent thereto, and parallel arms disposed outwardly of said lift arms in embracing relation thereto, with their deck pivots disposed above the deck pivots of the lift arms, each lift arm being composed of an inner arm section attached to a mount pivot and an outer arm section connected by an elbow pivot to the outer end of said inner section for hinging vertically from an extended position to an upwardly bent foreshortened position relative to said inner section in which said deck is retracted toward said mount pivots, said connected arm sections having stop means interengageable at said extended position to transmit lift from said inner arm sections to said outer arm sections, and each parallel arm being of foreshortenable sectional construction, operable in an extended condition to transmit loads in tension therethrough for leveling support of the deck while lift is applied thereto by said lift arms, and yieldable to a foreshortened condition permitting said retraction of the deck, said elbow hinging of the lift arms providing for folding the deck into the linkage for stowing beneath said floor and within its margin, said linkage further including a cross bar bridging between and secured to said inner lift arm sections adjacent the mount pivots; and an actuator connected between said cross bar and said mount and operable to transmit lift to said lift arms.

14. Lift apparatus as defined in claim 13, wherein said deck comprises a heel section connected to the deck pivots and an extension section hinged to the outer transverse margin of said heel section and foldable over the same: and wherein said linkage has an open space between said inner lift arm sections, adapted to receive said extension section and through which it is projected when the deck is folded into the linkage.

15. Lift apparatus for a vehicle, adapted to be stowed below the floor area of the vehicle, within the margin thereof, comprising: a load-carrying deck; parallel arm linkage having at one end means including vertically-spaced deck pivots connecting it to said deck and at its other end having means including vertically-spaced mount pivots for mounting said other end beneath an elevated floor for upward swinging of said deck to a position extending horizontally outwardly from a margin of said floor, said linkage comprising laterally-spaced pairs of arms, each pair comprising a compression arm and a tension arm, each compression arm being composed of an inner arm section attached to a mount pivot and an outer arm section connected by a horizontal-axis elbow pivot to the outer end of said inner section for hinging movements providing for vertical and fore-aft swinging of said deck; the connected arms having mutually engageable stop means below said elbow pivot axis for preventing relative hinging of said inner and outer arms downwardly past a plane of said axis, whereby each outer arm section is movable from an extended position locked to its inner section by interengagement of said stop means so as to be operable in compression to provide leveling support for said deck, to a bent, foreshortened position relative to said inner section in which said deck is retracted toward said mount pivots, each tension arm being of foreshortenable sectional telescoping construction including stop means operable in an extended condition to transmit loads in tension therethrough for leveling support of the deck, and telescopically yieldable to a foreshortened condition permitting said retraction of the deck, said elbow-hinging of the compression arms providing for folding the deck into the linkage for stowing beneath said floor and within its margin; and an actuator for transmitting lift to said linkage.

16. Lift apparatus as defined in claim 15, including outboard brackets secured to the deck and supporting said deck pivots, said brackets having means supporting the tension arm-deck pivots spaced outwardly from the sides of the deck.

17. Lift apparatus for a vehicle, adapted to be stowed below the floor area of the vehicle, within the margin thereof, comprising: a load-carrying deck; parallel arm linkage having at one end means including vertically-spaced deck pivots connecting it to said deck and at its other end having means including vertically-spaced mount pivots for mounting said other end beneath an elevated floor for upward swinging of said deck to a position extending horizontally outwardly from a margin of said floor, said linkage comprising laterally-spaced pairs of arms, each pair comprising a compression arm and a tension arm, at least one arm of each pair being of sectional, foreshortenable construction such as to provide for orbiting of the deck pivots about one another to effect folding of the deck into the linkage for stowing beneath said floor, said compression arms being disposed adjacent and outwardly of the sides of the deck and said tension arms being disposed outwardly of said compression arms; and outboard brackets including sturdy bracket arms secured to the deck, projecting laterally outwardly therefrom and having upwardly projecting fingers closely adjacent said tension arms and supporting the tension arm-deck pivots spaced outwardly from the sides of the deck; and actuator means for applying lift to said linkage said outboard brackets projecting above the floor-deck level to an extent at least equal to the thickness of the deck adjacent said brackets.

References Cited

UNITED STATES PATENTS

| | | | |
|---|---|---|---|
| 2,820,554 | 1/1958 | Vogel et al. | 214—77 |
| 2,989,196 | 6/1961 | Lugash | 214—77 |
| 3,258,140 | 6/1966 | Appleman | 214—77 |
| 3,269,567 | 8/1966 | Lugash | 214—77 |
| 3,282,451 | 11/1966 | Corley | 214—77 |

ROBERT G. SHERIDAN, *Primary Examiner.*